Sept. 13, 1966  T. L. SMITH  3,272,534
FLEXIBLE BAND COUPLING WITH TAPPED INSERT
Filed May 21, 1965  2 Sheets-Sheet 1

INVENTOR.
TELFORD L. SMITH
BY
ATTORNEY

Sept. 13, 1966 T. L. SMITH 3,272,534
FLEXIBLE BAND COUPLING WITH TAPPED INSERT
Filed May 21, 1965 2 Sheets-Sheet 2
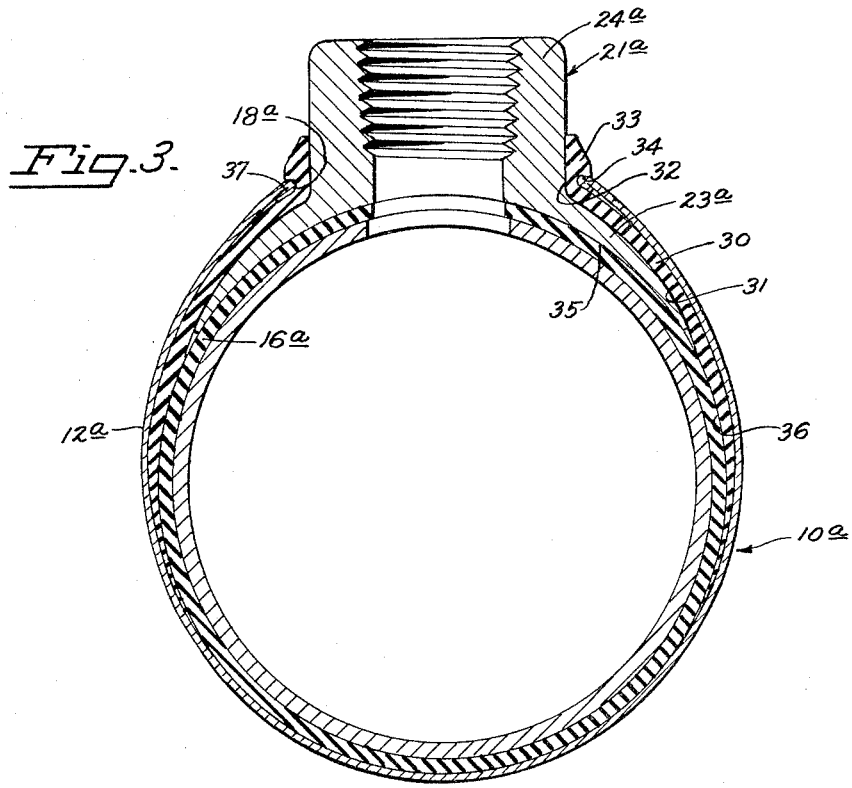
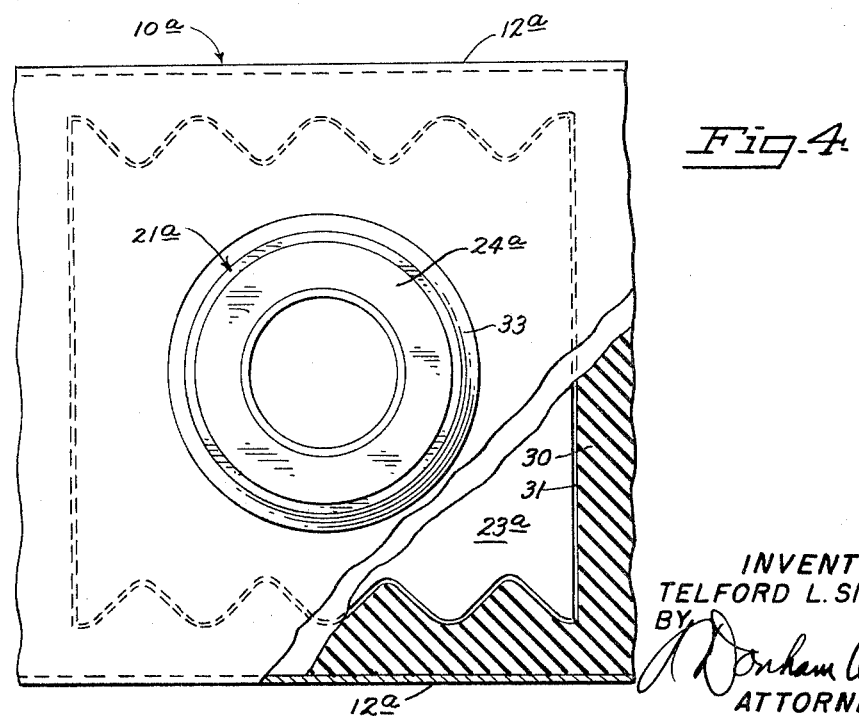
INVENTOR
TELFORD L. SMITH
BY
Dunham Owen
ATTORNEYS United States Patent Office 3,272,534
Patented Sept. 13, 1966

3,272,534
FLEXIBLE BAND COUPLING WITH
TAPPED INSERT
Telford L. Smith, 1206 Lake St., Millbrae, Calif.
Filed May 21, 1965, Ser. No. 462,784
8 Claims. (Cl. 285—47)

This application is a continuation-in-part of application, Serial No. 333,538, filed December 26, 1963, now abandoned.

This invention relates to a repair or service clamp for providing a branch service outlet on a main fluid conduit or, more particularly, for replacing a leaking or pulled branch outlet fitting in a fluid conduit.

In water system conduits tapped outlet fittings or so-called corporation stops which provide service to branch lines from the conduit, often develop leaks due to corrosion, or they are displaced or damaged by excavation around the conduit. When either situation occurs the leaking or damaged outlet fitting or corporation stop must be removed and replaced. Heretofore this repair job was accomplished by means of saddle type clamps or service repair clamps especially designed for this purpose and comprising rigid clamp bodies of cast metal retained on the pipe by heavy straps.

The principal object of the present invention is to provide an improved device for repairing damaged or leaking corporation stops and the like and particularly one that utilizes the basic components of the well known full circle pipe repair clamp composed of a flexible band with lugs attached to the end of the band that are drawn together by bolts to tighten the band around the pipe. In accordance with the invention, the flexible band is utilized in combination with a rigid member having a threaded boss portion aligned with an opening in the pipe and adapted to be retained between the band and a full circle gasket that is around the pipe.

Another object of the invention is to provide a service repair clamp comprising an unattached rigid tapped insert member which cooperates in a unique manner with a flexible band and a full circle gasket within the band, so that as the band is tightened a durable fluid tight seal is provided around the insert member without the need for additional sealing gaskets. The insert member has a curved base portion which conforms substantially to the curvature of the pipe being revised, and the ends of this base portion are tapered in thickness and preferably provided with wavy or irregular-shaped edges. This latter feature enables the insert member to be pressed tightly against the band gasket as the band is tightened without forming any abrupt continuous depressions along the ends of the gasket that could cause leakage.

Another object of this invention is to provide a service repair clamp utilizing a flexible metal band in combination with a rigid metal tapped insert member and an insulating gasket between the insert member and the band that is shaped in a unique manner so that it is retained in the optimum position around the insert member, and is highly effective in preventing any electrolytic action that could cause corrosion of the insert member or the band when the clamp is installed underground.

Still another object of the invention is to provide a service repair clamp utilizing a flexible band and rigid lugs to draw the band together in combination with a rigid tapped insert member that fits through the opening in the band aligned with the pipe opening and which is insulated therefrom so as to prevent any electrolytic corrosion between the band and the insert member even though these latter two components may be made of different metals.

Other important objects of the present invention are: to provide a service repair clamp that is unusually easy to install with a minimum of labor and without special tools; to provide a pipe repair device for replacing leaking or pulled corporation stops which can accommodate a wide range of pipe sizes without modification; and to provide a pipe repair device for repairing service outlets that utilizes parts of other existing pipe repair clamp components and which is therefore well adapted for ease and economy of manufacture.

Still further objects, advantages and features of the invention will become apparent from the following detailed description presented in conjunction with the accompanying drawings, in which:

FIG. 3 is an enlarged fragmentary view in section showing a somewhat modified form of the present invention utilizing an anti-corrosion gasket;

FIG. 4 is an enlarged fragmentary view in side elevation showing the embodiment of FIG. 3 with the clamp band removed.

Figure 1:
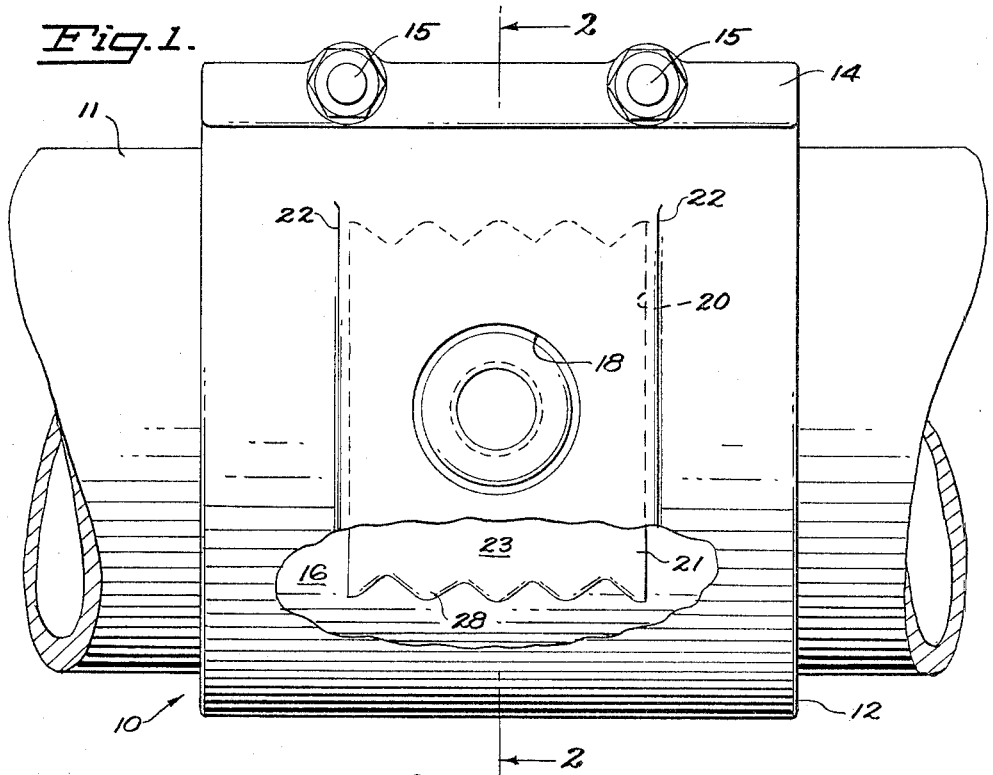
FIG. 1 is a view in side elevation showing a service repair clamp embodying the principles of the invention, a portion of the band has been broken away to show the tapped insert member in greater detail.

In the drawings, FIG. 1 shows a flexible band type service clamp 10 embodying the principles of the invention. The clamp is held around a main conduit 11 that has a side opening to which is normally fitted a corporation stop or some similar type of service outlet providing flow through a branch line to the main conduit. The service clamp 10 is generally utilized when the corporation stop has been damaged or has developed a leak and thus must be removed.

Figure 2:
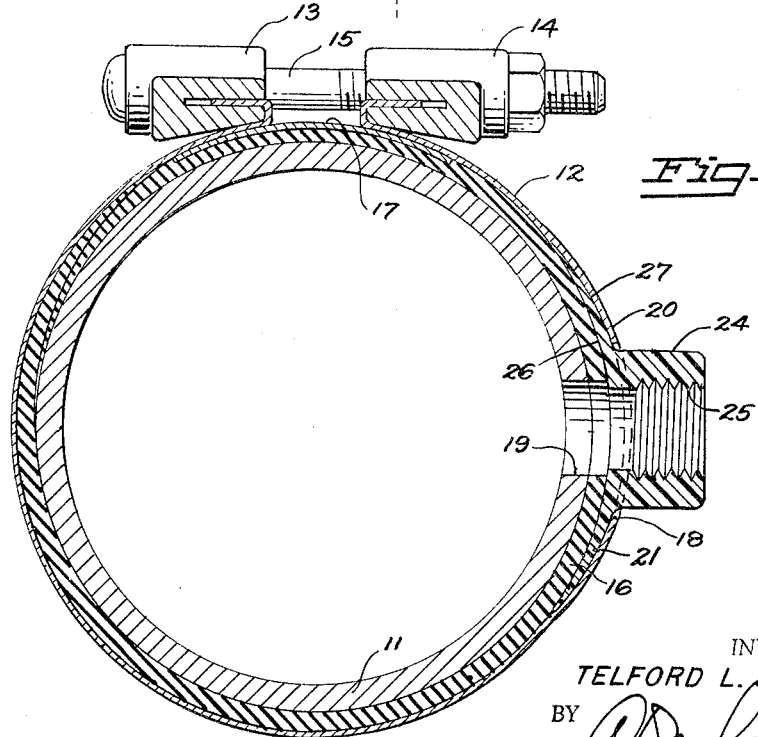
FIG. 2 is a view in end elevation and in section taken along line 2—2 of FIG. 1.

In general, the service clamp 10 comprises a flexible band 12 of uniform width which is made of a suitable malleable metal material such as copper or stainless steel. To the ends of the band are fixed a pair of rigid lug members 13 and 14 connected by a plurality of bolts 15. The lug members may be of any suitable type similar to those used in the various pipe repair clamps that are well known in the art. In FIGS. 1 and 2 the lugs 13 and 14, as shown, have the same configuration and are attached to the band in the same manner as those described in U.S. Patent No. 3,183,938. However, it is to be understood that within the scope of the present invention, other types of lugs could be used to draw the band 12 together as the bolts 15 are tightened.

Situated within the malleable band 12 is a full circular gasket 16 of the type that is used with standard pipe repair clamps. Preferably the gasket comprises a uniform thickness of relatively soft but resilient elastomeric material having a waffle-like inner surface and provided with an armor strip 17 of metal similar to that of the band 12 located between its ends on its outer surface. The armor strip 17 extends between the lugs 13 and 14 when they are drawn together to prevent any damage to the gasket 16 and to maintain adequate gasket pressure on the pipe between the lugs.

In accordance with the present invention, the malleable band 12 is provided with a circular opening 18 which must be aligned with an aperture 19 in the main conduit 11 when the clamp 10 is installed. As shown in the embodiments of FIGS. 1 and 2 a portion of the band may be bulged outwardly from its normal contour around the opening 18 so that it forms a recessed area 20 on the inside of the band that is adapted to receive a rigid tapped insert member 21. The recessed or indented area 20 may be preformed in a die press or by any suitable means and its shape is determined by a pair of parallel creases 22 in the band that extend circumferentially on opposite sides of the opening 18.

The insert member 21 is formed from some rigid material such as metal by casting or forging, or from a hard durable plastic. It has a curved base portion 23 and an intergal tubular boss portion 24 tapped to form a threaded bore 25 extending from the base portion 23. The inside or concave surface 26 of the base portion 23 has a radius of curvature substantially equal to or somewhat less than that of the main conduit 11 on which the service clamp 10 is to be installed. The outer surface 27 of the base portion 23 has a smaller radius of curvature than the inner surface 26 and thus the ends of the base portion 23 taper evenly from its mid-portion to a minimum thickness at the edges. Also along its end edges the base portion 23 is provided with a series of spaced apart projections 28 which form an irregular edge pattern. The edge pattern may be either saw tooth, as shown, or wavy, or it could have some other suitable configuration of projections separated by spaces. This irregular edge pattern on the ends of the base portion 23 of the insert member 21 is an important feature of the service clamp 10 because it prevents the formation of any leakage passages around the insert member 21 and along the gasket 16 after the band has been tightened and presses the boss member 21 tightly against it. As the base portion 23 engages the gasket 16, the elastomeric gasket material deforms between the projections 28 and this assures a tight seal between the base member and the gasket by preventing any continuous fluid passage from forming along its end edges.

In the embodiment of FIGS. 1 and 2 the tapped insert member 21 is made of a rigid plastic material such as nylon which has an advantage of being non-corrosive, but under certain circumstances it is preferred that the insert member be made of a metal such as bronze or brass. A metal insert member must be kept from contacting the metal band 12 in order to prevent any electrolytic corrosion action between these two parts from taking place once the clamp is installed in the ground. This problem is solved by another embodiment of my invention shown in FIGS. 3 and 4, by means of an insulating gasket member 30. Here, a service clamp 10a is provided with a metal insert member 21a having a curved base portion 23a and a tubular tapped boss portion 24a. The clamp 10a also has a circular gasket 16a and a flexible band 12a with lugs attached to its ends for tightening the band around the pipe being serviced in the manner shown in FIG. 1. However, in this embodiment no recessed area in the band and thus no deformation of the band is required for seating the skirt portion 23a of the boss member 21a. Instead, the insulating gasket 30 is relatively large having a width preferably equal to that of the circular gasket and a length that is approximately one-half the length of the circular gasket 16a. In cross section the insulating gasket 30 is tapered in thickness from near its central portion to its end edges. Thus, when the insulating gasket lies on the circular gasket 16a its end edges are feathered and do not form abrupt shoulders on the circular gasket. The flexible band 16a is therefore merely required to assume a slightly elliptical shape and fits around both the circular gasket 12a and the insulating gasket 30 thereon without having to bulge abruptly at any one location. Yet, it still is in contact with and applies uniform pressure to gasket material at all areas around the pipe.

On its underside which is adjacent to the upper surface of the circular gasket, the insulating gasket 30 is provided with a cavity 31 having the same shape and only slightly larger than the skirt portion 23a of the boss member 21a. Centrally located within the cavity 31 is a circular opening 32 through which the tubular boss portion 24a extends. Forming the opening 32 is an integral tubular portion 33 of the insulating gasket 30 which extends outwardly from its upper surface. At the termination of this tubular portion 33, an annular flange or lip portion is provided which forms a shoulder 34. The tubular gasket portion 33 is adapted to fit snugly around the tubular boss portion 24a, and when its skirt portion 23a is within the cavity 31 the undersurface 35 of the skirt portion 23a is flush with the undersurface 36 of the insulating gasket.

When installed, the tapped insert member 21a extends through an opening 18a in the flexible band which is aligned with those of the circular gasket and the insulating gasket. Around the edge of the band opening 18a a bead 37 is formed by turning the metal under. This provides a smooth reinforced edge that fits around the tubular portion 33 of the insulating gasket and lies just beneath the shoulder 34.

When the service clamp 10a is installed the insulating gasket 30 is first placed in position within the band 16a with its tubular portion 33 extending through the opening 18a and its annular lip or shoulder portion 34 extending over the surrounding bead portion 37 of the band. The insert member 21a is then pushed through the tubular gasket portion 33 with its skirt portion 23a seated within the gasket cavity 31. As the insert member is seated, the tubular gasket portion 33 is wedged tightly between it and the surrounding band 16a. Thus, the insert member 21a is not only held firmly in place, but it is thoroughly insulated from the flexible band. At the most critical point of possible contact the annular lip or shoulder portion 34 of the insulating gasket provides a relatively wide insulated separation of the dissimilar metals in the boss member and the band.

It should be apparent from the foregoing that the present invention provides an improved solution to the problem of repairing or replacing corporation stops on main line conduits. The boss member 21 may be made of a standard size and can be utilized with flexible bands of any desired size to suit a particular pipe. Thus, the invention takes advantage of all the previously known features of flexible band type pipe repair clamps and provides a repair clamp for service outlets that is effective, durable, easy to install and inexpensive.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A repair clamp for replacing a leaking or a pulled direct tapped outlet fitting in a fluid conduit, comprising in combination:

a flexible metal band extending around the pipe and having an opening aligned with the orifice in the pipe for the removed damaged fitting;

a gasket between the pipe and said band;

a pair of rigid lug members fixed to the ends of said band;

bolt means supported by said lug members for pulling the lugs together to tighten said band, said band having an outwardly projecting area surrounding said band opening;

a tapped insert member having a curved base portion seated within the recess formed by said projecting area in said band and an integral boss portion with a threaded bore extending through said band opening, the outer periphery of the base portion of the insert member being completely enclosed by the band said base portion having end portions tapered in cross section with spaced apart projections at said end portions forming an irregular shaped edge pattern, whereby when said band is tightened said fitting is secured tightly between said band and said gasket and the gasket material is allowed to flow between the end projections, thereby forming an effective seal around the fitting base portion said gasket having a circumferential length greater than the circumference length of said insert member.

2. The repair clamp as described in claim 1 wherein said boss member is formed of a non-conductive plastic material.

3. The repair clamp of FIG. 1 wherein said base portion on said boss member has an inside concave surface with a radius of curvature slightly less than that of the pipe being repaired.

4. A repair clamp for replacing a leaking or a pulled direct tapped outlet fitting in a fluid conduit, comprising in combination:

a flexible band of a malleable metal extending around the pipe and having an opening aligned with the orifice in the pipe for the removed damaged fitting;

a circular elastomeric gasket extending around the pipe beneath said band;

a pair of lug members fixed to the ends of said band;

bolt means supported by said lug members for pulling the lugs together to tighten said band, said band having an outwardly projecting area surrounding said band opening;

a rigid insert member formed of metal and having a curved base portion seated within the recess formed by said projecting area in said band and an integral boss portion with a bore extending through said base portion, said base portion being tapered in cross section from its mid-point to its ends, said ends having spaced apart projections forming an irregular shaped edge portion;

an insulating gasket between the upper surface of said insert member and said flexible band, extending beyond the edges of said base portion and having an opening fitted tightly around said boss portion, and thereby preventing any contact between said band and said boss member;

whereby when said band is tightened said fitting is secured tightly between said band and said circular gasket and the gasket material is allowed to flow between the end projections and form an effective seal around the fitting base portion.

5. The clamp as described in claim 4 wherein said insulating gasket has a cavity on its undersurface which lies adjacent the upper surface of said circular gasket, said cavity having the same shape as the base portion of said insert member, whereby the bottom surface of said insert base portion is flush with the undersurface of said insulating gasket.

6. The clamp as described in claim 5 wherein said insulating gasket has approximately the same width and one-half the length of said circular gasket, the thickness of said insulating gasket being tapered toward feathered edges at opposite ends, whereby the band of said clamp assumes a slightly elliptical shape when tightened around the pipe.

7. The clamp as described in claim 5 wherein said insulating gasket has a tubular portion extending outwardly from its opening on the side opposite from said cavity, and an integral lip member on said tubular portion forming an annular shoulder overlapping the band around the band opening and thereby separating the band from the metal insert to prevent electrolytic corrosive action.

8. In a repair clamp for providing a direct tapped outlet fitting in a fluid conduit including a metal band extending around the pipe having an opening aligned with an orifice in the pipe, a circular gasket extending around the pipe inside the band, means for tightening said band around the pipe, and a rigid metal insert member having an integral boss portion with a threaded bore extending through said band opening and an integral base portion on the inside of said band, the improvement comprising:

a generally semi-circular insulating gasket member retained between the upper surface of said insert member and said flexible band, said insulating gasket having a cavity on its undersurface for accommodating said base portion so that the undersurface of the base portion can be flush with that of said insulating gasket when the clamp is assembled;

an opening through said insulating gasket within said cavity and a tubular portion extending outwardly from said latter opening on the upper surface of said insulating gasket, said tubular portion including an annular bead forming an outwardly extending shoulder at its outer end for receiving said band, the thickness of said insulating gasket being tapered toward feather edges at opposite ends.

References Cited by the Examiner

UNITED STATES PATENTS

| 2,179,476 | 11/1939 | Andrus | 285—189 X |
| 2,788,231 | 4/1957 | Crow | 285—197 X |
| 2,788,541 | 4/1957 | Kemnitz | 285—197 X |
| 3,086,555 | 4/1963 | Smith | 138—99 |
| 3,188,121 | 6/1965 | Cude et al. | 285—197 |

FOREIGN PATENTS 625,461   8/1961   Canada.

CARL W. TOMLIN, *Primary Examiner.*

T. F. CALLAGHAN, *Assistant Examiner.*